(12) United States Patent
Johansson et al.

(10) Patent No.: US 8,825,394 B2
(45) Date of Patent: Sep. 2, 2014

(54) GRAPHICAL USER INTERFACE

(75) Inventors: Oskar Johansson, Stockholm (SE);
Maria Södergren, Segeltorp (SE);
Fredrik Roos, Segeltorp (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/131,971

(22) PCT Filed: Jul. 2, 2012

(86) PCT No.: PCT/SE2012/050756
§ 371 (c)(1),
(2), (4) Date: Jan. 10, 2014

(87) PCT Pub. No.: WO2013/012378
PCT Pub. Date: Jan. 24, 2013

(65) Prior Publication Data
US 2014/0157175 A1    Jun. 5, 2014

(30) Foreign Application Priority Data

Jul. 15, 2011    (SE) ........................ 1100538

(51) Int. Cl.
*G01C 21/32*    (2006.01)
*G06F 19/00*    (2011.01)

(52) U.S. Cl.
USPC ................ 701/457; 701/94; 340/995.17

(58) Field of Classification Search
CPC ........ G01C 21/32; G01C 21/36; G06F 19/00; B60W 40/06; B60W 40/076
USPC ................ 701/457, 431, 93, 94, 447, 96; 340/995.14, 995.17
See application file for complete search history.

(56) References Cited

U.S. PATENT DOCUMENTS

| 8,284,995 | B2 | 10/2012 | Diaz et al. ................ 382/104 |
| 2011/0098922 | A1* | 4/2011 | Ibrahim .................... 701/208 |
| 2012/0083984 | A1* | 4/2012 | Johansson et al. ........... 701/70 |

FOREIGN PATENT DOCUMENTS

| DE | 10 2008 012 697 A1 | 6/2009 |
| DE | 10 2009 018 073 A1 | 1/2010 |
| EP | 1 530 026 A1 | 5/2005 |
| EP | 1 562 021 A1 | 8/2005 |
| WO | WO 2009/074206 A1 | 6/2009 |

OTHER PUBLICATIONS

International Search Report mailed Nov. 15, 2012 in corresponding PCT International Application No. PCT/SE2012/050756.

* cited by examiner

*Primary Examiner* — Tan Q Nguyen
(74) *Attorney, Agent, or Firm* — Ostrolenk Faber LLP (57) ABSTRACT

A system having a user interface which presents map data $D_{map}$. An analysis unit analyzes map data $D_{map}$, determining a quality Q for these map data $D_{map}$ which are to be presented. The determination is based on whether the respective map data $D_{map}$ are available and/or reliable. The quality Q is presented graphically by a presentation unit. The risk of wrong decisions being taken on the basis of deficient map data $D_{map}$ is reduced considerably, since the user can easily decide whether there are reliable map data or not.

14 Claims, 3 Drawing Sheets

GRAPHICAL USER INTERFACE

CROSS-REFERENCE TO RELATED APPLICATIONS

The present application is a 35 U.S.C. §§371 national phase conversion of PCT/SE2012/050756, filed Jul. 2, 2012, which claims priority of Swedish Patent Application No. 1100538-6, filed Jul. 15, 2011, the contents of which are incorporated by reference herein. The PCT International Application was published in the English language.

TECHNICAL FIELD

The present invention relates to a system comprising a user interface for presenting reliable map data.

BACKGROUND

In today's vehicles, map data $D_{map}$ are used in many areas of application. One such area is for navigation by means of a positioning system, e.g. a GPS (global positioning system). Another such area is for estimation of running resistance for a vehicle. In such estimations, map data related to road gradients $\alpha$ are very important. Another such area is in today's economical cruise controls which take account inter alia of the running resistance, which itself depends inter alia on the road gradient $\alpha$. Another such area is various systems for automatic gearchanging, in which gear choice is for example based on road gradient $\alpha$. Map data related to road curvature are also used by various systems.

Today's traditional cruise controls maintain a constant reference speed $v_{ref}$ which corresponds to the speed $v_{set}$ chosen by the driver. The value of the reference speed $v_{ref}$ is only altered when the driver adjusts the set speed $v_{set}$ while driving. Certain economical cruise controls, e.g. Scania's Ecocruise, try to estimate a current running resistance and also have knowledge of the historical running resistance.

An experienced driver of a vehicle without cruise control can reduce fuel consumption by adapting his/her driving to the characteristics of the road ahead so that unnecessary braking and/or fuel-consuming acceleration can be avoided. A further development of the aforesaid economical cruise controls tries to mimic the experienced driver's adaptive driving on the basis of knowledge of the road ahead so that fuel consumption can be kept as low as possible, since this very greatly affects profitability for an owner of the vehicle, e.g. a haulage company or the like.

An example of such a further development of an economical cruise control is a "Look Ahead" cruise control (LACC), i.e. a strategic cruise control which uses knowledge of road sections ahead, i.e. knowledge of the nature of the road ahead, to determine the reference speed $v_{ref}$. Here the reference speed $v_{ref}$ is therefore allowed, within a certain speed range, to differ from the set speed $v_{set}$ chosen by the driver, in order to run the vehicle in a way which saves more fuel.

Knowledge of the road section ahead may for example comprise prevailing topography, road curvature, traffic situation, roadworks, traffic density, state of road, speed limits on the road section ahead, and traffic signs beside the road. This knowledge may for example be obtained from location information, e.g. GPS (global positioning system) information, map data $D_{map}$ and/or topographical map data, weather reports, weather measurements, information communicated between different vehicles and information communicated by radio. These different types of knowledge may be used in various ways. For example, knowledge of a speed limit on the road ahead may be used to achieve fuel efficiency by lowering the vehicle's speed before the lower speed zone is reached. Similarly, knowledge of a road sign conveying information about, for example, a roundabout or intersection ahead may also be used for fuel efficiency by braking before reaching the roundabout or intersection.

With an intelligent cruise control which takes account of topography ahead, i.e. a Look Ahead cruise control, the vehicle's reference speed $v_{ref}$ can therefore be optimised for different types of road, engine performance and train weight in order to achieve fuel saving if this is prioritised. A more powerful vehicle can also be achieved if this is optimised, as in the "power mode" application. A higher mean speed can also be achieved without increasing the fuel consumption.

An economical cruise control may for example predict the vehicle's speed along a horizon of any suitable length, e.g. about 1-2 km. The vehicle's future speed along the horizon may be predicted in various ways, such as driving with a traditional cruise control with a reference speed $v_{ref}$ which is the same as the set speed $v_{set}$, or varying the reference speed $v_{ref}$ relative to the set speed $v_{set}$.

A Look Ahead cruise control (LACC) does for example allow the reference speed $v_{ref}$ to be raised, before an upgrade, to above the set speed $v_{set}$, since the vehicle will presumably lose speed on the upgrade owing to high train weight relative to engine performance. Similarly, the LACC allows the reference speed $v_{ref}$ to drop to below the set speed $v_{set}$ before a downgrade on which the vehicle will presumably be accelerated by its train weight. The concept here is that it is better from a fuel economy perspective to take advantage of the vehicle's acceleration by its own weight downhill than to initially accelerate before the downgrade and then brake on the downgrade. The LACC can thus reduce fuel consumption without greatly affecting journey time.

There are also cruise controls which use a current running resistance as a basis for deciding how the vehicle's speed should vary. In such cruise controls, the reference speed $v_{ref}$ can be allowed to deviate from the set speed $v_{set}$ on the basis of at least one characteristic of the running resistance, e.g. its magnitude and/or pattern over time.

Examples of known systems for presenting map data are found in e.g. EP1562021, EP1530026, DE102009018073 and DE102008012697.

BRIEF DESCRIPTION OF THE INVENTION

In this specification, the invention is primarily exemplified for use in, or in combination with, a cruise control system, e.g. a Look Ahead cruise control (LACC), i.e. a strategic cruise control which can use knowledge of the nature of the road ahead to control the reference speed $v_{ref}$.

The present invention may also be used in substantially all systems on board the vehicle which use map data $D_{map}$, e.g. the aforesaid navigation systems, running resistance estimation systems and automatic gearchange systems.

Map data $D_{map}$ may contain errors, e.g. erroneous road gradients, erroneous speed limits, erroneous road signs or any other kind of error.

Errors in map data $D_{map}$ may lead to wrong decisions being taken by systems on board the vehicle or by the driver. Such decisions may result in the vehicle not being run in an optimum way.

For example, erroneous topographical data may lead to economical cruise controls taking decisions which are not optimum for fuel consumption, or to a gear change in an automatic gearchange system being not effected, being effected unnecessarily or being effected at a wrong time.

It is difficult for a driver of the vehicle to be aware of whether for example an economical cruise control takes wrong decisions. Even if the driver does detect that wrong decisions are taken, it is difficult for him/her to decide why they are taken, potentially leading to driver uncertainty about the function of, for example, the economical cruise control. This may lead to less use of the economical cruise control and hence to greater total fuel consumption.

SUMMARY OF THE INVENTION

An object of the present invention is to propose a system comprising a user interface which reduces the risk of wrong decisions by, for example, vehicle drivers and/or on-board systems.

The present invention makes it easy for a user of the interface, who may for example be a driver, to form an opinion about how well different systems which use map data $D_{map}$ will work. He/she may therefore use the presentation of the quality Q for map data $D_{map}$ as a basis for understanding whether for example an economical cruise control which bases its decisions inter alia on map data $D_{map}$ can take correct decisions or not.

The present invention results in a visually clear presentation of the map data quality Q. For example, different colours, or absence of colours, may indicate the quality Q of map data $D_{map}$ for an area, a road or a segment of a road.

This for example makes it easy for a driver to see the quality Q of map data $D_{map}$ and use this quality as a basis for deciding whether or not to use systems which use these map data $D_{map}$. The driver may then for example choose to deactivate an economical cruise control or not to rely upon the routing proposals presented to him/her by a navigation device. The driver can thus reduce the risk of wrong decisions being taken on the basis of deficient map data $D_{map}$.

BRIEF LIST OF DRAWINGS

The invention is explained in more detail below with reference to the attached drawings, in which the same reference notations are used for similar items, and in which.

DESCRIPTION OF PREFERRED EMBODIMENTS

Figure 1:
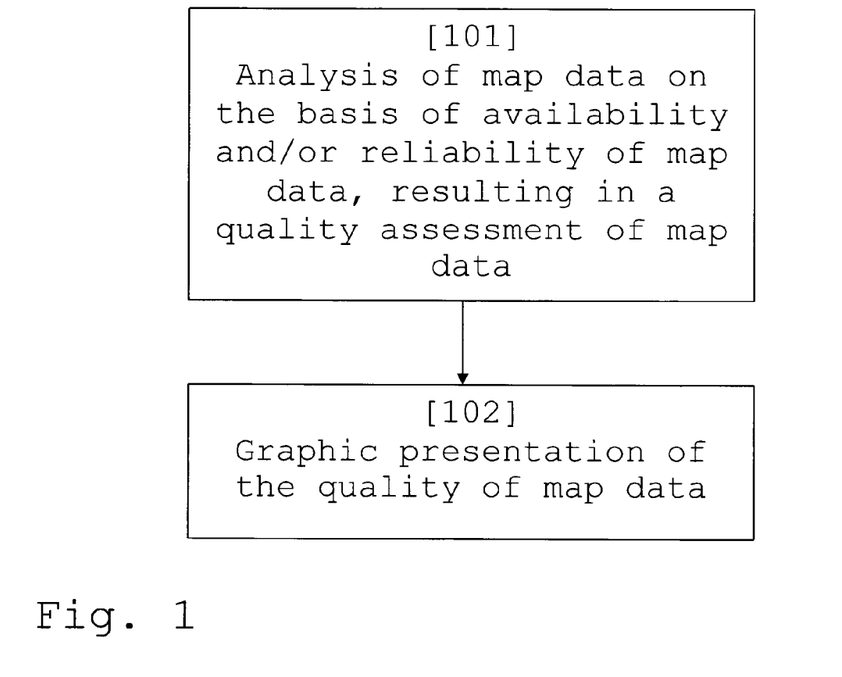
FIG. 1 is a flowchart for the method according to the invention.

The present invention makes it possible for the quality Q of map data $D_{map}$ to be presented in a user interface. FIG. 1 is a flowchart for the method according to the present invention. As a first step 101 of the method, an analysis unit does an analysis of map data $D_{map}$ which are to be presented on the user interface. This analysis determines/assesses the quality Q of the respective map data $D_{map}$ on the basis of availability and/or reliability of map data. As a second step 102 of the method, a presentation unit presents the quality Q thus arrived at of map data $D_{map}$ graphically for a user of the interface, e.g. a driver of a vehicle which is provided with the user interface.

The present invention therefore relates also to a system comprising a user interface which comprises a presentation unit 300, e.g. a visual display screen for viewing of information. The system for user interfaces according to the invention is configured for presenting map data $D_{map}$. A non-limitative example of such a display of map data $D_{map}$ appears in FIG. 3.

Figure 3:
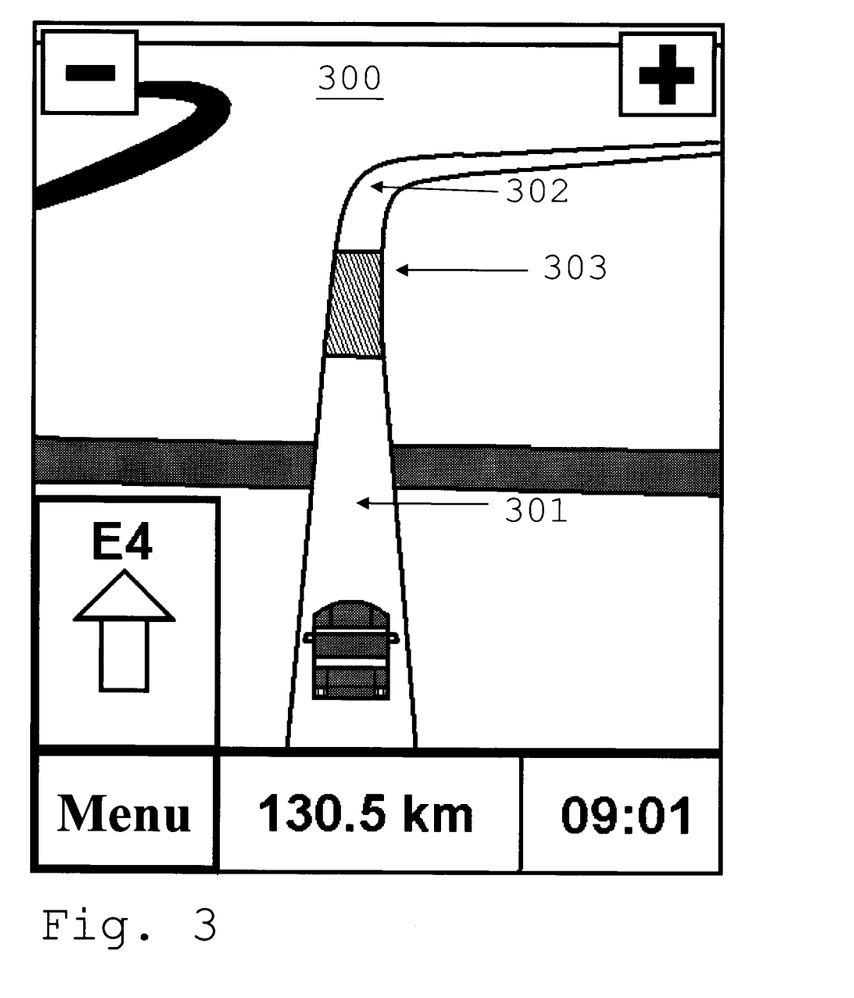
FIG. 3 depicts an example of a view in a presentation unit in a system for a user interface.

The user interface system comprises also the analysis unit adapted to analysing map data $D_{map}$. The analysis involves determining the quality Q of the respective map data $D_{map}$. The system comprises also a presentation unit 300 configured for presenting graphically the quality Q determined for the respective map data $D_{map}$. This makes it easy for a user of the interface to utilise information about availability and/or reliability of map data $D_{map}$ presented by the user interface system.

As the user of the interface, e.g. the driver, can thus have the quality Q of map data $D_{map}$ presented to him/her, this makes it easy for him/her to decide whether map data $D_{map}$ are available and/or reliable, e.g. for an area, a road or a road segment where he/she is at the time or is intending to be. Having this knowledge also enables the driver to form an opinion about how well systems which use map data $D_{map}$ will work for the particular area, road or road segment. The driver may for example decide on the basis of this graphic presentation of the map data quality Q whether to use or not to use a particular system. By deactivation he/she may thus for example prevent an economical cruise control or automatic gearchange system from taking wrong decisions on the basis of erroneous topographical map data $D_{map}$. Greater total fuel consumption due to wrong decisions can thus be avoided.

As mentioned above, the analysis unit can determine individual values for the quality Q of map data $D_{map}$ for different geographical areas, e.g. different parts of towns, unbuilt-up areas, forested or nature areas or other areas which have a geographical extent. Individual values for the quality Q of map data $D_{map}$ may also be determined for different roads or different segments of a road. The resolution for the quality determination may therefore be chosen so as to be optimised for different situations.

The analysis unit can determine the quality Q of map data $D_{map}$ on the basis of several parameters. One such parameter is whether map data $D_{map}$ are available at all. According to an embodiment of the invention, the quality rating "lack of map data" $D_{map,lack}$ is given if no map data $D_{map}$ are available at all.

Another such parameter is reliability of map data which are available. On the basis of this parameter the analysis unit gives the quality rating "reliable map data" $D_{map,rel}$ if the map data are deemed reliable, and the quality rating "unreliable map data" $D_{map,non-rel}$ if the map data are not deemed reliable.

For certain systems an estimation unit may make its own internal estimate of data related to map data $D_{map}$ if map data are identified as erroneous. There are several different ways in which erroneous map data $D_{map}$ may be identified, e.g. a vehicle speed/speed variation predicted by an economical cruise control may be compared with an actual measured speed/speed variation for a road segment. If they differ, errors in map data $D_{map}$ may be identified by the analysis unit, since the predicted speed is calculated on the basis of map data $D_{map}$, inter alia on the basis of the road gradient α.

Estimated values for, for example, the road gradient α may also be compared with corresponding map data $D_{map}$ for the gradient α of the same road segment. If they differ, the system may find that map data $D_{map}$ contain errors. Moreover, the correct estimate of the gradient α may at a later stage be used by the system instead of the erroneous map data $D_{map}$, making it possible for decisions which are better-founded and more optimised to be taken. The risk of wrong decisions by vehicle drivers and/or on-board systems is thus reduced.

Figure 2:
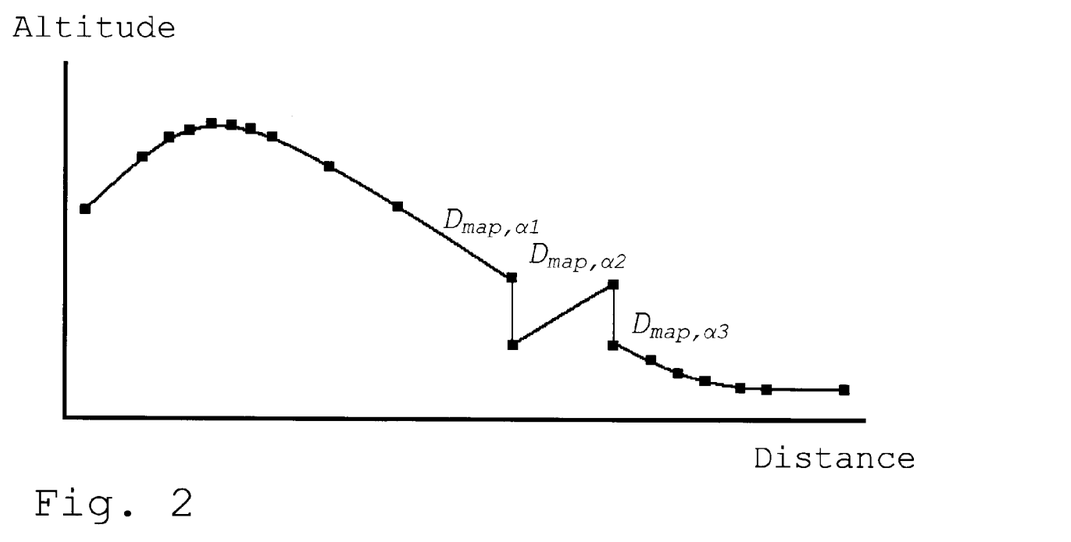
FIG. 2 depicts an example of map data $D_{map}$ for road gradient α on a stretch of road.

FIG. 2 depicts a schematic example of erroneous map data $D_{map}$ for the road gradient α due to an inverted representation of gradient $D_{map,\alpha2}$ for a road segment on part of a journey. The altitude curve for the respective stretch of road shows clearly that there are very likely to be erroneous map data $D_{map,\alpha2}$ for a segment on the downgrade, since there are jumps/hops/steps/discontinuities in the map data road gradient $D_{map,\alpha}$. In this case, estimated values for the road gradient $D_{est,\alpha2}$ and map data $D_{map,\alpha2}$ for the road gradient α2 will differ for the inverted segment, whereupon the system may find that there are erroneous map data $D_{map,\alpha2}$ for the segment.

Errors in map data $D_{map}$ may also be identified by the system entirely on the basis of map data $D_{map}$, by comparing them with other map data, i.e. with map data for adjoining road segments, to see whether they differ from one another in such a way that it may be assumed that map data $D_{map}$ for at least one of the segments are erroneous. For example, the inverted map data road gradient $D_{map,\alpha2}$ for a segment depicted in FIG. 2 may be identified by the analysis unit from the presence of large jumps/hops/steps/discontinuities for the map data road gradient $D_{map,\alpha}$ which are detectable when the map data road gradients $D_{map,\alpha1}$, $D_{map,\alpha3}$ for the adjoining road segments are compared with the map data road gradient $D_{map,\alpha2}$ for the inverted segment.

If erroneous map data $D_{map}$ are identified, internal estimates $D_{map,est}$ of corresponding data may then be made and be stored in certain systems. This results in self-estimated map data $D_{map,est}$ which can be used instead of the erroneous map data $D_{map}$. For example, an internal estimate $D_{map,est}$ of the gradient α for a road segment may thus be used instead of map data $D_{map}$ provided by, for example, a map company.

The quality of such self-estimated map data $D_{map,est}$ also needs to be determined. According to an embodiment of the invention, the analysis unit gives the quality rating "reliable self-estimated map data" $D_{map,est,rel}$ where such an estimate is of high quality, or "unreliable self-estimated map data" $D_{map,est,non-rel}$ where such an estimate is of low quality.

Certain systems use sensor fusions as a means of pooling estimates made in cases where map data contain errors. Several estimates of, for example, road gradients α made by one or more vehicles may thus be pooled to form a self-estimated value $D_{map,est}$ for the road gradient α. An embodiment of the invention also takes the reliability of this sensor fusion into account in the determination of the quality Q of self-estimated data as "reliable self-estimated map data" $D_{map,est,rel}$ or "unreliable self-estimated map data" $D_{map,est,non-rel}$.

According to the invention, the quality Q of map data $D_{map}$ may be estimated by one or more methods which the system is adapted to applying. These methods are described below.

According to the present invention, the quality Q of map data $D_{map}$ is determined by the analysis unit on the basis of how well a vehicle speed is predicted by the economical cruise control. This involves comparing a predicted speed/speed variation for at least one road segment and an actual speed/speed variation for the same at least one segment.

An economical cruise control, e.g. a Look Ahead cruise control (LACC), predicts a speed/speed variation for a road segment ahead on the basis inter alia of topographical map data $D_{map}$, e.g. road gradient data. The quality Q of this topographical map data $D_{map}$ may therefore be determined by the analysis unit on the basis of the comparison of the predicted and the actual speed/speed variation. The magnitude of a difference detected by the comparison may thus be converted to a quality rating such that a smaller difference results in a higher quality Q than a larger difference.

The specific magnitude ranges for the comparative difference which result in the various respective quality values, e.g. reliable map data $D_{map,rel}$ and unreliable map data $D_{map,non-rel}$, may here be varied for different running situations. This is because the running resistance varies depending on external factors in different situations, e.g. the nature of the carriageway and wind acting upon the vehicle.

The result is very effective determination of the quality Q of map data $D_{map}$. The determination is also very computingly efficient in that the LACC still predicts the speed for road segments ahead when determining the reference speed $v_{ref}$ which the vehicle is to apply.

The vehicle's speed may for example be predicted as $$v = \dot{v} * dt \quad \text{(eq. 1)}$$

in which $\dot{v}$ is the vehicle's acceleration and $$\dot{v} = \frac{1}{m_v}(F_{drive} - F_{air} - F_{roll} - F_{grav} - F_{brake}),$$

dt is the time between two consecutive speed samples, $m_v$ is the vehicle's weight, $F_{drive}$ is the vehicle's driving force, $F_{air}$ is the vehicle's air resistance, $F_{roll}$ is the vehicle's rolling resistance, $F_{grav}$ is the gravitational force which acts upon the vehicle in horizontal directions, and $F_{brake}$ is the braking force acting upon the vehicle's wheels.

Several of the forces which act upon the vehicle are determined on the basis of map data $D_{map}$. For example, the rolling resistance $F_{roll}$ and the gravitational force $F_{grav}$ depend on the road gradient α, which at the time of prediction is taken from map data $D_{map}$. The quality of map data $D_{map}$ may therefore be determined on the basis of how well the speed prediction corresponds to the actual speed, since map data $D_{map}$ of lower quality Q result in less accurate predictions.

According to an embodiment of the present invention, the analysis unit bases determination of the quality of map data $D_{map}$ on comparison of a road gradient α, taken from map data $D_{map,\alpha}$ for a road segment, with an estimate $D_{map,est}$ of the gradient α for the same segment. Map data $D_{map}$ for the road gradient α are thus here compared with a hopefully correct estimate $D_{map,est}$ of the gradient α, which estimate is made by the system for identification of errors in map data $D_{map}$, which is for example situated on board a vehicle, or by any suitable on-board system which uses the road gradient α in its function or in its calculations.

The road gradient α may be estimated in various ways, e.g. by at least one from among a force equation method (described in relation to equation 2 below), an accelerometer method (described in relation to equation 3 below) or an altitude change method. According to an embodiment of the invention, any suitable combination of two or more of these three methods may be used in estimating the road gradient α.

The altitude change method may for example use information from GPS and/or gyro in cases where the length of the segment is known, e.g. because the sampling interval is known. The road gradient α may then be calculated by trigonometry, since the altitude change over a distance travelled is known.

An estimate of the road gradient α may for example be made as follows when the road gradient α is relatively slight such that sin α≈α:

$$\alpha = \frac{m_v * \dot{v} - F_{drive} + F_{roll} + F_{air} + F_{brake}}{m_v * g} \quad \text{(eq. 2)}$$

in which
$m_v$ is the vehicle's weight,
$\dot{v}$ is the vehicle's acceleration;
$F_{drive}$ is the vehicle's driving force,
$F_{roll}$ is the vehicle's rolling resistance,
$F_{air}$ is the vehicle's air resistance,
$F_{brake}$ is the braking force acting upon the vehicle's wheels, and
g is the acceleration due to gravity.

The estimate $D_{map,est}$ of the road gradient α may then be compared with a road gradient α indicated in map data $D_{map}$ to decide the quality Q of map data $D_{map}$.

According to an embodiment of the present invention, the road gradient is estimated as above when a steady state prevails and/or there are relatively high train weights for the vehicle, since this results in more accurate estimates. An example of a steady state is when the vehicle maintains a constant speed, i.e. when no acceleration is taking place. High train weights may here mean for example weights over 15 tons.

In the case of vehicles equipped with an accelerometer, the road gradient α in cases where the gradient is relatively slight such that sin α≈α may also be estimated by means of the accelerometer as follows $$\alpha = \frac{\text{accelerometer} - a_{wheel}}{g} \quad \text{(eq. 3)}$$

in which
accelerometer represents the acceleration value from the accelerometer,
$a_{wheel}$ is a calculated wheel acceleration, and
g is the acceleration due to gravity.

One skilled in the art will appreciate that other methods for estimating the road gradient α may also be used in conjunction with the present invention.

The magnitude of a difference detected by comparing the estimate of the road gradient α and the road gradient α indicated in map data $D_{map}$ may then be converted to a quality rating such that a smaller difference results in a higher quality Q than a larger difference.

To sum up, the analysis unit can thus use the magnitude of a difference detected by comparison between map data $D_{map}$ and data related to these map data to determine the quality Q, since this magnitude can be converted to a quality rating. This conversion may for example be done in such a way that a smaller difference results in a higher quality Q than a larger difference.

Limits for the specific magnitude ranges with which this magnitude is compared in order for example to classify the quality, e.g. as reliable map data $D_{map,rel}$ and unreliable map data $D_{map,non-rel}$, may here be varied for different running situations of the vehicle. In particular, limits for a current running situation may be used to set magnitude ranges such that the current running situation is that of the vehicle close to the time of the quality determination.

According to an embodiment of the present invention, an estimate of the road gradient α made by the analysis unit by any of the above methods for estimation of the road gradient α is supplemented by an offset value $\alpha_{offset}$. This offset value $\alpha_{offset}$ indicates by how much the road gradient α according to map data $D_{map}$ may differ from the estimate of the road gradient α without resulting in downgrading of the quality Q. In other words, the map data road gradient $D_{map,\alpha}$ is here given a high quality Q if it is comprised within the estimated value plus/minus the offset value $\alpha_{offset}$, i.e. α±$\alpha_{offset}$. According to other embodiments, the offset value $\alpha_{offset}$ may here be indicated as absolute values or as relative values related to the road gradient α.

According to an embodiment of the present invention, the quality Q of map data $D_{map}$ is determined by the analysis unit on the basis of a quality Q rating indicated by the map data supplier for the quality Q of map data $D_{map}$. For example, the map data supplier may indicate that reconstruction, repairs, layout changes, new construction or the like have taken place or will take place on a road, a fact which may be used for the quality determination in such a way that the quality Q of map data $D_{map}$ is deemed low.

According to an embodiment, the quality Q of map data $D_{map}$ is determined by the analysis unit statistically, e.g. on the basis of a normal distribution, in such a way that the map data $D_{map}$ are given a certain quality value if a certain proportion of them meet the requirements for the respective quality value. For example, map data $D_{map}$ may then be given the quality rating of reliable map data $D_{map,rel}$ if 95% or more of the respective map data $D_{map}$ meet the requirements for being classified as reliable map data $D_{map,rel}$.

The quality Q of map data $D_{map}$ may also be determined statistically by the analysis unit in such a way that if a certain proportion of road segments ahead have a relative error or an absolute error which is below a certain value, this results in a certain quality value. For example, map data $D_{map}$ may here be determined as having the quality value of reliable map data $D_{map,rel}$ if 95% of the road segments have a relative error below 10%. In other words, a user then knows that if map data classified as reliable $D_{map,rel}$ indicate a road gradient α of 1%, then 95% of the road segments will have a road gradient α within the range 0.9-1.1%.

A statistical accuracy for the road gradient α may also comprise one or more other measurements such as
a relative error for a proportion of all the road gradient α data which are less than a percentage value,
a relative error of less than a percentage value for road gradients which are less than a certain gradient, and
a relative error for road gradients which are less than a certain gradient.

According to an embodiment, the quality Q of map data $D_{map}$ may be road-specific. Thus the supplier of map data $D_{map}$, or self-estimated map data $D_{map,est}$, may be given a quality rating, e.g. based on the statistical accuracies described above, pertaining to a specific road. The map data supplier may for example then indicate that a first road has a statistically normal distribution of accuracy for the gradient α such that a relative error for 95% of all data for the gradient α is less than 1% and/or the relative error is less than 1% for gradients of less than 10% and/or the gradient error is less than 0.1% on gradients of less than 1%. For another road, similar accuracies may for example apply to only 90% of all data for the gradient α. For a third road, similar accuracies may for example apply to 98% of all data for the gradient α.

According to an embodiment of the present invention, the quality Q is determined by the analysis unit over a period of time T. Determining the quality Q over a period T affords the advantage of less importance being for example attached to temporary large differences between estimated data and map data $D_{map}$. This means that the effect of the noisiness of the difference, e.g. where data are estimated on the basis of estimated acceleration, is reduced. Map data are therefore not assessed too quickly on the basis of temporary "spikes" in the signal, e.g. for estimation of road gradients α.

According to an embodiment of the present invention a raised value for the difference between estimated data and map data $D_{map}$ has to persist for at least a period $T_{offset}$ for it to be taken into account in determining the quality Q. In other words, this embodiment disregards temporary high values, so-called "spikes" in the signal for the difference between estimated data and map data $D_{map}$.

According to an embodiment of the present invention, quality values may also be weighted depending on the amount of time/distance for which they occur. Thus more importance may here be attached to quality determinations based on longer stretches of road/times than to temporary quality values. This embodiment also counteracts erroneous quality determinations due to individual erroneous values, e.g. for vehicle speeds and road gradients.

According to an embodiment of the invention, the analysis unit gives a road segment a lower quality value, e.g. unreliable map data $D_{map,non-rel}$, if for example there are no map data $D_{map}$ for an intersection or a new stretch of road within the road segment, even if the segment has otherwise very good quality Q of map data $D_{map}$. According to the present invention, the quality Q is determined on the basis of at least how large a proportion of the segment there are map data for, so that a low quality value is set if a substantial proportion of the segment lacks map data.

According to an embodiment of the present invention, major wear of the carriageway results in the road segment being given a lower quality value. Carriageway friction, which may be regarded as a measure of carriageway wear, may for example be estimated by using available standard values for friction of different types of asphalt. The estimate may also take temperature and weather conditions into account, e.g. carriageway friction is affected by moisture, so a rain sensor and/or camera may for example be used in the estimation of such friction/wear.

According to an embodiment of the present invention, the analysis unit determines the quality at least partly on the basis of the classification of a road, e.g. whether it is a motorway, a national highway or some other type of road.

According to an embodiment of the invention, detection of a constant offset of map data $D_{map}$ and/or erroneous scaling of map data $D_{map}$ results in a road segment being given a lower quality value.

According to an embodiment of the present invention, the analysis unit takes the vehicle's train weight and/or engine performance into account in determining the quality Q of map data $D_{map}$ if the road segment has different reliabilities for different road gradients. Estimates made when the train weight is greater are more reliable in that fewer jumps/spikes occur in the signals for the acceleration and the gradient. With a given train weight for the vehicle and at a given gear ratio it is also possible to calculate the magnitude of road gradients where the vehicle at its current speed needs to decelerate during maximum engine torque or to decelerate during drag torque. It is thus possible to ensure that the quality determination is correct at a gradient where the vehicle accelerates during drag torque and/or decelerates during maximum engine torque at a current set speed.

Systems which use map data are particularly sensitive to errors in map data $D_{map}$ for the aforesaid road gradients where the vehicle has to decelerate at maximum engine torque or decelerate at drag torque. If for example a cruise control, e.g. an economical cruise control, takes wrong decisions about respectively raising and lowering the vehicle's speed before upgrades and downgrades, errors in map data $D_{map}$ are a possible reason for the wrong decisions. Such decisions are greatly reduced by using the present invention.

When the quality determination has been done, it has to be presented by the presentation unit in a way which is clear and readily comprehensible to a user of the interface, e.g. a driver of a vehicle.

According to an embodiment of the present invention, the presentation unit uses different graphic features for different values of the quality Q. It thus gives a particular graphic feature to each of the different values for the quality Q, so that a first graphic feature indicates reliable map data $D_{map,rel}$, a second indicates unreliable map data $D_{map,non-rel}$, a third indicates reliable self-estimated map data $D_{map,est,rel}$, a fourth indicates unreliable self-estimated map data $D_{map,est,non-rel}$, and a fifth indicates lack of map data $D_{map,lack}$.

According to an embodiment of the invention, all of these first, second, third, fourth and fifth graphic features are different so that a particular one is used for each individual quality Q. The result is a detailed graphic presentation of the quality Q of map data $D_{map}$.

According to another embodiment of the invention, at least two of these graphic features are alike. For example, the same graphic feature may be used for the quality ratings of reliable map data $D_{map,rel}$ and reliable self-estimated map data $D_{map,est,rel}$, while another illustration may be used to represent the quality ratings of lack of map data $D_{map,lack}$, unreliable map data $D_{map,non-rel}$ and unreliable self-estimated map data $D_{map,est,non-rel}$. The result is a readily comprehensible and clear graphic presentation of the quality Q of map data.

According to an embodiment of the invention, the graphic features take the form of colours. In this case, areas, roads or segments of roads are coloured on the basis of the quality Q determined for each of them. It should be noted here that white is also a colour, so lack of colouring, e.g. a road coloured white, may also indicate a quality Q. FIG. 3 depicts a non-limitative example of what a presentation unit 300, which might take the form of a visual display screen, for a user interface might look like with this embodiment implemented. In this example there are reliable map data $D_{map,rel}$ for a first segment 301 and a second segment 302 of a road, whereas a third segment 303 of the road lacks map data or has unreliable map data $D_{map,non-rel}$. This is presented here graphically here by the first segment 301 and the second segment 302 being for example coloured green or white, whereas the third segment 303 has a different colour, e.g. red. As may be seen in FIG. 3, this presentation of map data quality becomes very clear and easy to understand, which is a great advantage in enabling a driver to utilise the information while driving the vehicle.

According to another embodiment of the present invention, the graphic features take the form of different patterns. In FIG. 3 the third segment 303 would then for example be hatched, squared or patterned in any other suitable way which is clearly distinct from the pattern, or lack of pattern, of the first segment 301 and the second segment 302. According to another embodiment of the present invention, the graphic features take the form of different symbols. Any suitable symbols may here be used, preferably with meanings which are intuitively understood by users. A happy face ("smiley"), a thumb pointing upwards or some other intuitively positive symbol may for example be used if map data are reliable. In contrast, a sad face, a thumb pointing downwards, a warning sign or some other intuitively negative symbol may for example be used if map data are unreliable or lacking. In FIG. 3, the third segment would thus be indicated by a particular negative symbol which clearly tells the user that map data are lacking $D_{map,lack}$ or unreliable $D_{map,non-rel}$.

According to another embodiment of the present invention, the graphic features take the form of different signs. In this case any suitable signs may be used, preferably with meanings which are intuitively understood by users. Signs which are used in school marking systems or other well-known ranking systems, e.g. numerals, letters and combinations thereof, may for example be used. Thus the letter "A", the numeral "1" or some other intuitively positive sign may be used if map data are reliable. Similarly, the letter "U", the numeral "5" or some other intuitively negative sign may be used if map data are unreliable or lacking. It should be noted here that different countries have different ranking systems, e.g. in schools, so the signs used may need to be suited to the respective countries so as to be intuitively understood by users. The third segment in FIG. 3 would therefore be indicated by a particularly negatively charged sign which clearly tells you that map data are lacking $D_{map,lack}$ or unreliable $D_{map,non-rel}$.

The different embodiments for the various graphic features may also be combined, allowing a combination of at least two from among colours, patterns, symbols and signs to be used. What is important here is that the combination results in presentation which is intuitively easy for users to read and understand, e.g. so that a driver can concentrate on driving the vehicle.

According to an embodiment of the present invention, the graphic presentation of the map data quality Q is used in navigation. In this case the user of the interface may by simply looking at the user interface find out whether there are available map data for an area, a road or a segment of a road where he/she is driving or about to drive. This may enable the user to choose not to drive into an area or join a road where map data are unreliable $D_{map,non-rel}$. Users thus avoid wrong decisions caused by lack of map data $D_{map,lack}$ or by unreliability of available map data $D_{map,non-rel}$.

According to an embodiment of the present invention, the graphic presentation of the map data quality Q is used in conjunction with using a cruise control. The cruise control may for example take the form of economical cruise control whereby the user can on the basis of the graphic presentation of the quality Q of map data decide whether to use economical cruise control or not. Users are typically likely to deactivate the economical cruise control if the graphic presentation of the quality Q of map data indicates significant risks of wrong decisions by the economical cruise control due to lack of map data $D_{map,lack}$ or to only having access to unreliable map data $D_{map,non-rel}$. As mentioned above, economical cruise control can be used to optimise the vehicle's reference speed $v_{ref}$ for different road types, engine performance and train weight to achieve fuel saving if this is prioritised. A more powerful vehicle or a higher mean speed without greater fuel consumption may also be achieved if this is prioritised.

One skilled in the art will appreciate that the system according to the present invention may be implemented in a computer programme which, when executed in a computer, causes the computer to apply the method described above. The computer programme usually takes the form of a computer programme product 403 stored on a digital storage medium, and is contained in such a product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 4:
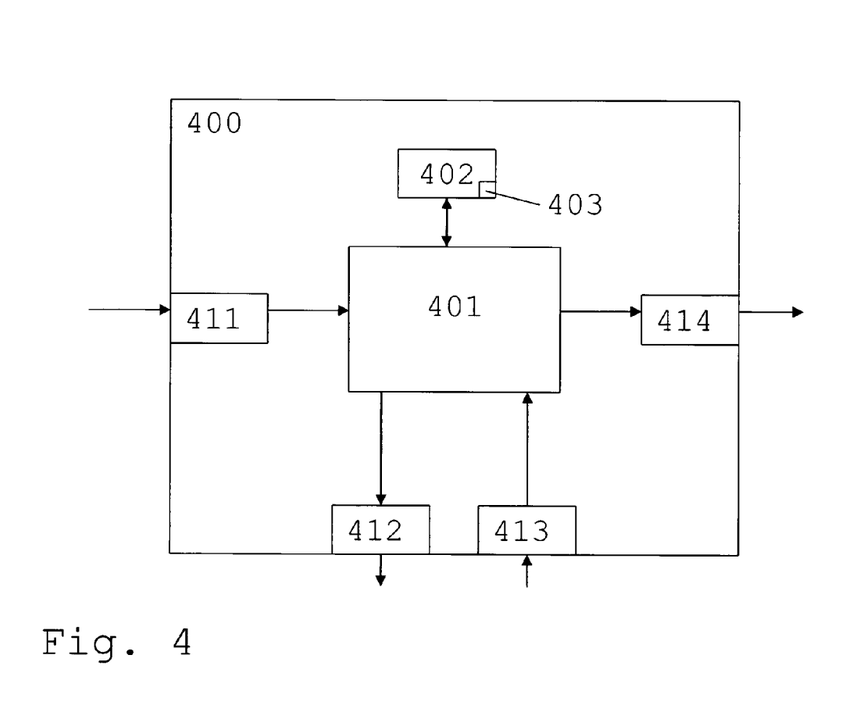
FIG. 4 depicts a control unit which works according to the invention.

FIG. 4 depicts schematically a control unit 400 comprising a calculation unit 401 which may take the form of substantially any suitable type of processor or microcomputer, e.g. a circuit for digital signal processing (digital signal processor, DSP), or a circuit with a predetermined specific function (application specific integrated circuit, ASIC). The calculation unit 401 is connected to a memory unit 402 which is situated in the control unit 400 and which provides the calculation unit with, for example, the stored programme code and/or stored data which the calculation unit needs to enable it to do calculations. The calculation unit is also adapted to storing partial or final results of calculations in the memory unit.

The control unit 400 is further provided with respective devices 411, 412, 413, 414 for receiving and sending input and output signals. These input and output signals may comprise waveforms, pulses or other attributes which the input signal receiving devices 411, 413 can detect as information and which can be converted to signals processable by the calculation unit 401. These signals are then supplied to the calculation unit 401. The output signal sending devices 412, 414 are arranged to convert signals received from the calculation unit 401 in order, e.g. by modulating them, to create output signals which can be conveyed to other systems on board the vehicle.

Each of the connections to the respective devices for receiving and sending input and output signals may take the form of one or more from among a cable, a data bus, e.g. a CAN (controller area network) bus, a MOST (media oriented systems transport) bus or some other bus configuration, or a wireless connection.

One skilled in the art will appreciate that the aforesaid computer may take the form of the calculation unit 401 and that the aforesaid memory may take the form of the memory unit 402.

One skilled in the art will also appreciate that the above system may be modified according to the various embodiments of the method according to the invention. The invention relates also to a motor vehicle, e.g. a truck or a bus, provided with at least one system for a user interface according to the invention.

The present invention is not restricted to the embodiments described above but relates to and comprises all embodiments within the protective scope of the attached independent claims.

The invention claimed is:

1. A system comprising a user interface configured for presenting map data ($D_{map}$) in a vehicle, the system comprising
 an analysis unit configured for analysis of map data ($D_{map}$), involving determination of a quality (Q) for said map data
 a presentation unit adapted to graphic presentation of said quality (Q), and wherein said analysis unit is configured for basing said determination of said quality on whether said map data ($D_{map}$) are available and/or reliable, by a comparison of a vehicle speed being predicted by a cruise control system having knowledge of road sections ahead based on said map data ($D_{map}$) with an actual measured vehicle speed, said quality (Q) being determined by the magnitude of a difference detected by said comparison of said predicted vehicle speed and said actual measured vehicle speed.

2. A system according to claim 1, in which said analysis unit is configured for determining said quality (Q) on the basis of:
reliability of an internal estimate ($D_{map,est}$) of data related to said map data.

3. A system according to claim 2, in which said analysis unit is configured for determining a quality (Q) for an internal estimate ($D_{map,est}$) of data related to said map data ($D_{map}$) on the basis of said comparison by using said internal estimate ($D_{map,est}$) instead of said map data ($D_{map}$).

4. A system according to claim 1, in which said analysis unit is configured, when making said determination of said quality (Q), for giving said map data ($D_{map}$) at least one of the following quality values:
reliable map data ($D_{map,rel}$),
unreliable map data ($D_{map,non-rel}$),
reliable self-estimated map data ($D_{map,est,rel}$),
unreliable self-estimated map data ($D_{map,est,non-rel}$),
lack of map data ($D_{map,lack}$).

5. A system according to claim 1, in which said analysis unit is configured for determining individual values for said quality (Q) within the scope of at least one of the following:
a geographical area,
a road, and
a segment of a road.

6. A system according to claim 1, in which said presentation unit is configured for using different graphic features for different values of the quality (Q).

7. A system according to claim 6, in which said graphic features comprise at least one of the following:
colours,
patterns,
symbols, and
signs.

8. A system according to claim 1, in which said presentation unit is configured for using at least one of the following indications:
a first graphic feature to indicate reliable map data ($D_{map,rel}$),
a second graphic feature to indicate unreliable map data ($D_{map,non-rel}$),
a third graphic feature to indicate reliable self-estimated map data ($D_{map,est,rel}$),
a fourth graphic feature to indicate unreliable self-estimated map data ($D_{map,est,non-rel}$), and
a fifth graphic feature to indicate lack of map data ($D_{map,lack}$).

9. A system according to claim 1, in which said user interface comprises part of a navigation device which combines said map data ($D_{map}$) with positioning information.

10. A system according to claim 1, configured for providing the graphic presentation of said quality (Q) during navigation.

11. A system according to claim 1, configured for making an internal estimate of data related to said map data ($D_{map}$) if said analysis by said analysis unit shows that said map data ($D_{map}$) fall into any of the following categories:
unreliable map data ($D_{map,non-rel}$),
unreliable self-estimated map data ($D_{map,est,non-rel}$) and
lack of map data ($D_{map,lack}$).

12. A system according to claim 11, in which said internal estimate of said data is used by said system instead of said map data ($D_{map}$) after said internal estimate has been made.

13. A system according to claim 1, in which said analysis unit is configured, when determining said quality (Q), for comparing said magnitude of said difference with at least one magnitude range.

14. A system according to claim 13, in which said analysis unit is configured for determining limits for said at least one magnitude range on the basis of a current running situation of said vehicle.

* * * * *